US011441801B2

(12) United States Patent
Khoury et al.

(10) Patent No.: US 11,441,801 B2
(45) Date of Patent: Sep. 13, 2022

(54) ACCESS DOOR DETECTION USING A HUMIDITY SENSOR

(71) Applicant: Ademco Inc., Golden Valley, MN (US)

(72) Inventors: Tarik Khoury, Brno (CZ); Michal Sicner, Brno (CZ); Pavel Marak, Brno (CZ)

(73) Assignee: Ademco Inc., Golden Valley, MN (US)

( * ) Notice: Subject to any disclaimer, the term of this patent is extended or adjusted under 35 U.S.C. 154(b) by 333 days.

(21) Appl. No.: 16/842,585

(22) Filed: Apr. 7, 2020

(65) Prior Publication Data

US 2021/0310676 A1    Oct. 7, 2021

(51) Int. Cl.
| | | |
|---|---|---|
| *F24F 11/52* | (2018.01) | |
| *F24F 3/14* | (2006.01) | |
| *G05D 22/02* | (2006.01) | |
| *F24F 11/30* | (2018.01) | |
| *F24F 11/526* | (2018.01) | |
| *F24F 110/20* | (2018.01) | |

(52) U.S. Cl.
CPC ............... *F24F 11/30* (2018.01); *F24F 3/14* (2013.01); *F24F 11/526* (2018.01); *G05D 22/02* (2013.01); *F24F 2110/20* (2018.01); *F25B 2700/02* (2013.01); *F25D 2700/02* (2013.01)

(58) Field of Classification Search
CPC ....... F24F 3/14; F24F 11/526; F25D 2700/02; F25B 2700/02; G05D 22/00; G05D 22/02
See application file for complete search history.

(56) References Cited

U.S. PATENT DOCUMENTS 10,490,004 B2    11/2019    Gale et al.
2016/0364313 A1*  12/2016   Roth ................... G06F 11/3058

FOREIGN PATENT DOCUMENTS

| WO | 2018078685 A1 | 5/2018 | |
|---|---|---|---|
| WO | WO-2019007046 A1 * | 1/2019 | ............ A61L 9/015 |
| WO | WO-2020075824 A1 * | 4/2020 | ............ F24F 11/49 |

* cited by examiner

*Primary Examiner* — Henry T Crenshaw
*Assistant Examiner* — Daniel C Comings
(74) *Attorney, Agent, or Firm* — Shumaker & Sieffert, P.A.

(57) ABSTRACT

A humidifier device includes an output device, an atomizer enclosure having a first opening that is operable to be open and closed and a second opening, an atomizer within the atomizer enclosure configured to produce moisture and to output the moisture through the second opening of the atomizer enclosure, a humidity sensor configured to sense humidity levels, and control circuitry configured to control the atomizer and to determine whether the humidity levels sensed by the humidity sensor are indicative of the first opening of the atomizer enclosure being open. The output device is configured to, in response to determining that the humidity levels sensed by the humidity sensor are indicative of the first opening of the atomizer enclosure is open, output an alert indicative of the first opening of the atomizer enclosure being open.

20 Claims, 3 Drawing Sheets

ACCESS DOOR DETECTION USING A HUMIDITY SENSOR

TECHNICAL FIELD

The disclosure relates to heating, ventilation, and air conditioning (HVAC) humidifier systems.

BACKGROUND

Some forced air heating ventilation and air conditioning systems (HVAC) may include a humidifier appliance to add moisture to the air. In some examples, an HVAC system may air into an air duct and a humidifier can be mounted to the air duct to emit a fine water mist into the air within the air duct, thereby adding moisture to the air within the air duct.

SUMMARY

In general, aspects of the present the disclosure are directed to a humidifier device that includes an atomizer for outputting moisture into an air duct having air supplied by a heating, ventilation, and air conditioning (HVAC) system. In some examples, a housing in the humidifier device may include an access door that may be opened and closed in order to access the internal components of the humidifier device. For example, a user may open the access door in order to service the humidifier device, such as to replace one or more nebulizer elements of the atomizer of the humidifier device. After servicing the humidifier device, the user may close the access door.

However, in some instances, a user may, after opening the access door on a housing in the humidifier device, forget or otherwise fail to close the access door. When the access door is left open on the housing of the humidifier device, the access door may act as an additional opening through which the moisture produced by the atomizer may flow. Such moisture may potentially reach other components of the humidifier device, such as the control circuitry, and may potentially damage components of the humidifier device.

As such, in order to prevent potential damage to the components of the humidifier device, the humidifier device may detect when the access door has been left open and may output an alert to notify users of the humidifier device that the access door has been left open. In accordance with aspects of the present disclosure, the humidifier device may use a humidity sensor to detect whether the access door on a housing of the humidifier device is open. Because some of the moisture produced by the atomizer of the humidifier device may flow out of the open access door, the humidity sensor may sense an increased level of humidity when the access door is open compared to when the access door is closed. When the humidifier device determines, that the level of humidity sensed by the humidity sensor surpasses a threshold, the humidifier device may output an alert to notify users of the humidifier device that the access door has been left open, so that a user of the humidifier device may close the access door to prevent damaging the humidifier device.

In one example, the disclosure is directed to a method. The method includes producing, by an atomizer within an atomizer enclosure of a humidifier device, the atomizer enclosure having a first opening that is operable to be open and closed and a second opening, moisture through the second opening of the atomizer enclosure. The method further includes sensing, by a humidity sensor of the humidifier device, humidity levels. The method further includes determining, by the control circuitry, whether the humidity levels sensed by the humidity sensor are indicative of the first opening of the atomizer enclosure is open. The method further includes in response to the control circuitry determining that the humidity levels sensed by the humidity sensor are indicative of the first opening of the atomizer enclosure being open, outputting, by an output device, an alert indicative of the first opening of the atomizer enclosure being open.

In one example, the disclosure is directed to a humidifier device. The humidifier device includes an atomizer enclosure having a first opening that is operable to be open and closed and a second opening. The humidifier device further includes an atomizer within the atomizer enclosure configured to produce moisture and to output the moisture through the second opening of the atomizer enclosure. The humidifier device further includes a humidity sensor configured to sense humidity levels. The humidifier device further includes control circuitry configured to control the atomizer and to determine whether the humidity levels sensed by the humidity sensor are indicative of the first opening of the atomizer enclosure being open. The humidifier device further includes an output device configured to, in response to determining that the first opening of the atomizer enclosure is open, output an alert indicative of the first opening of the atomizer enclosure being open.

The details of one or more examples are set forth in the accompanying drawings and the description below. Other features, objects, and advantages will be apparent from the description, drawings, and claims.

DETAILED DESCRIPTION

Figure 1:
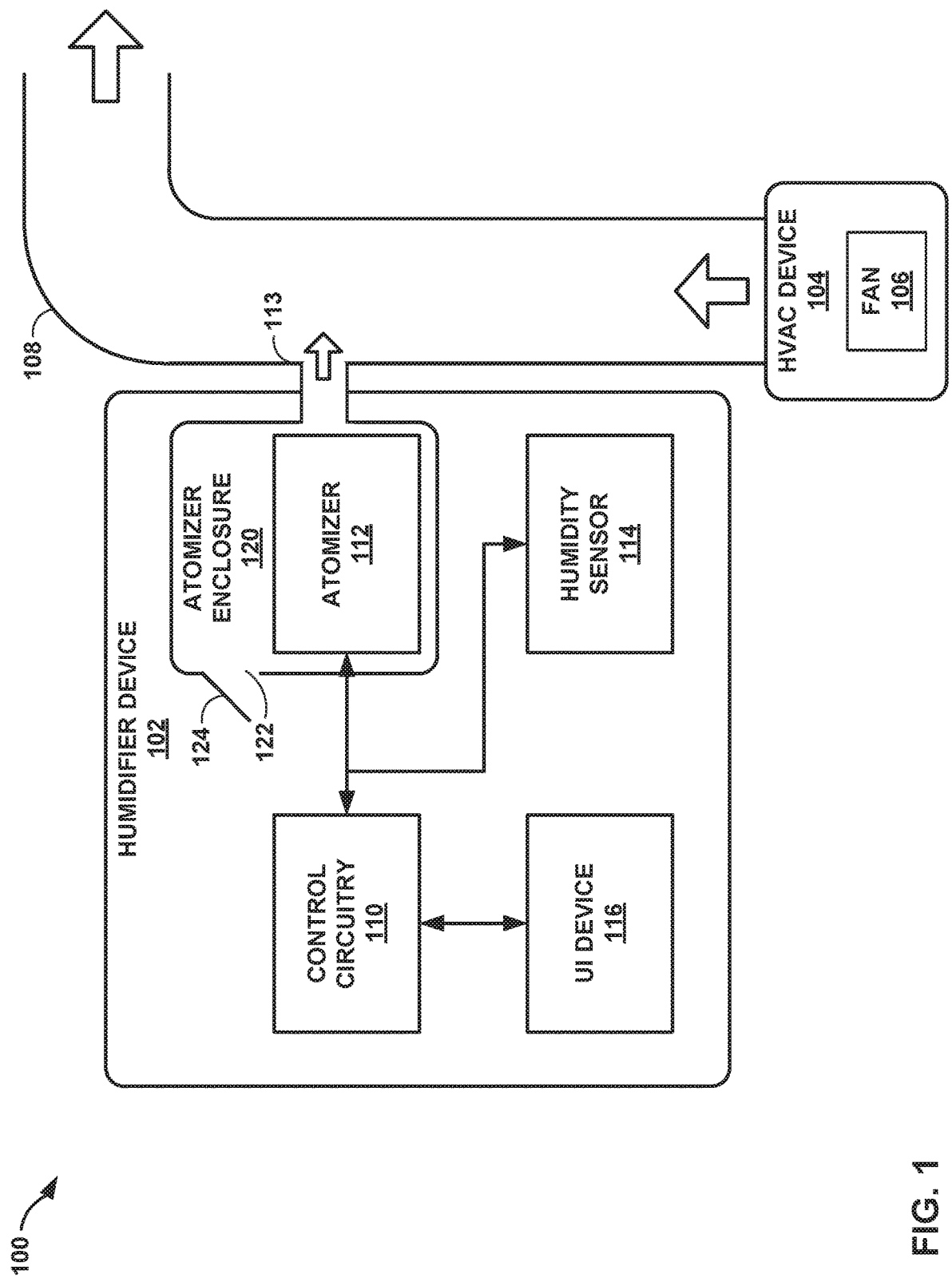
FIG. 1 illustrates an example humidifier device installed in a heating, ventilation, and air conditioning (HVAC) system according to one or more techniques of this disclosure.

FIG. 1 illustrates an example humidifier device installed in a heating, ventilation, and air conditioning (HVAC) system according to one or more techniques of this disclosure. The example of system 100 is one possible arrangement for a forced air HVAC system. In other examples, system 100 may include more or fewer components and a different arrangement of components.

As shown in FIG. 1, example system 100 includes humidifier device 102, HVAC device 104, and duct 108. System 100 may, for example, be installed in a residential or commercial building to heat, cool, filter, remove humidity, or circulate air within the building. HVAC device 104 may be operably coupled to duct 108 and may be configured to output air into duct 108. Humidifier device 102 may be operably coupled to duct 108 and may be configured to output moisture into duct 108, thereby humidifying the air flowing through duct 108.

Duct 108 in the example of system 100 may be an HVAC duct configured to convey air outputted by HVAC device 104 to, for instance, an inside space of a building or structure. Duct 108 may have a cross section of any suitable shape, such as a circular-shaped cross section, a rectangular-shaped cross section, and the like.

HVAC device 104 may be a heat exchanger, a heater, an air conditioner, or any other device that directs streams of air to duct 108. In some examples, HVAC device 104 includes heating and/or cooling elements that heats and/or cools the air that it directs to duct 108. In some examples, HVAC device 104 includes fan 106. Fan 106 may operate at any suitable speed in order to control the speed at which HVAC device 104 outputs air into duct 108.

Humidifier device 102 may be any suitable device configured to provide moisture into duct 108 to humidify the air being conveyed by duct 108, such as the air being output by HVAC device 104 into duct 108. Humidifier device 102 may include control circuitry 110, atomizer 112, humidity sensors 114, and user interface device 116. Although not explicitly shown in FIG. 1, humidifier device 102 may also include a water source such as a water tank or water inlet.

Atomizer 112 of humidifier device 102 may be any suitable device that is operable to produce moisture such as water flow, water mist, and the like, so that humidifier device 102 may use atomizer 112 to output moisture into duct 108. Humidifier device 102 may be coupled to duct 108 such that atomizer 112 of humidifier device 102 is positioned to provide moisture to the air being conveyed within duct 108. For example, duct 108 may include an opening 113 through which atomizer 112 of humidifier device 102 is able to provide the moisture to the air within duct 108. In some examples, atomizer 112 may include individual nebulizer elements that may be operable to produce moisture that is outputted into duct 108. These nebulizer elements may be in the form of nebulizer cartridges that can be swapped in and out of atomizer 112.

Humidifier device 102 may include atomizer enclosure 120 that encloses atomizer 112. For example, atomizer enclosure 120 may enclose atomizer 112 in order to prevent moisture produced by atomizer 112 from reaching other components of humidifier device, such as humidity sensor 114, control circuitry 110, and user interface device 116. Atomizer enclosure 120 may include opening 113 so that moisture produced by atomizer 112 is directed through opening 113 into supply duct 108 so that atomizer 112 may supply moisture to the air flowing within supply duct 108. While opening 113 of atomizer enclosure 120 may be connected to supply duct 108 to direct moisture produced by atomizer 112 into supply duct 108, opening 113 may be closed off or sealed off from the rest of the components of humidifier device 102 outside of atomizer enclosure 120, such as control circuitry 110, humidity sensor 114, and user interface device 116, in order to prevent moisture directed through opening 113 from reaching those components of humidifier device 102.

Furthermore, because atomizer 112 may occasionally require servicing, such as to replace or swap out one or more nebulizer cartridges, atomizer 112 may also include opening 122 through which atomizer 112 may be accessed, such as by a user of humidifier device 102, for maintenance, repairs, or other purposes. As such, atomizer enclosure 120 may include two openings: opening 113 and opening 122. Opening 122 may be closed during operations of humidifier device 102 to prevent moisture produced by atomizer 112 from being directed out of opening 122 and reaching the rest of the components of humidifier device 102 outside of atomizer enclosure 120 and may be opened to service atomizer 112. For example, an access door 124, may be operable to close and open in order to cover opening 122 and uncover opening 122, respectively.

Access door 124 may be as a door, a removable panel, a removable cover, a removable portion of the enclosure of humidifier device 102 and the like. In some examples, access door 124 may be coupled to atomizer enclosure 120 via a hinge so that access door 124 may swing open to uncover opening 122 of atomizer enclosure 120 and may swing closed to cover opening 122. In other examples, access door 124 may be completely detached from atomizer enclosure 120 when access door 124 is open and not covering opening 122 of atomizer enclosure 120, such as in the examples where access door 124 is a removable panel or removable cover. Thus, access door 124 may not necessarily be attached to atomizer enclosure 120 when access door 124 is open. In some examples, atomizer enclosure 120 and access door 124 may have a latching mechanism or other mechanism for latching access door 124 to atomizer enclosure 120 when access door 124 is closed. Examples of such latching mechanisms may include a latch, latch bolt, a zipper, a toggle latch, and the like.

When access door 124 is closed, access door 124 may cover opening 122 to prevent moisture outputted by atomizer 112 from flowing out of atomizer enclosure 120 through openings other than opening 113. When access door 124 is closed, access door 124 may not necessarily create a completely airtight seal with atomizer enclosure 120. Rather, when access door 124 is closed, it may substantially prevent moisture that from flowing out of opening 122. For example, the access door 124, when closed and thereby covering opening 122, may be able to prevent 95% of the moisture produced by atomizer 112 from leaking through opening 122 of atomizer enclosure 120. In some examples, access door 124 may be closed when access door 124 is latched to atomizer enclosure 120 via a latching mechanism, such as described above.

Humidity sensor 114 of humidifier device 102 may be operable to sense humidity levels such as the levels of absolute humidity, relative humidity, specific humidity, and the like. Examples of humidity sensor 114 may include a psychrometer, a hygrometer, a humidistat, and the like. In some humidity sensor 114 may be operatively coupled to control circuitry 110 and may be operable to send indications of the humidity levels sensed by humidity sensor 114 to control circuitry 110. In some examples, humidity sensor 114 may be configured to, when humidity sensor 114 determines the humidity level reaches and/or exceeds a threshold, send an indication that the humidity level has reached and/or exceeded the threshold to control circuitry 110.

User interface device 116 of humidifier device 102 may include an input device and an output device for humidifier device 102. For instance, user interface device 116 may include a touchscreen, a keyboard, a touchpad, or any other suitable input device for receiving user input, such as from a user of humidifier device 102. Further, user interface device 116 may include a display device, loudspeakers, or any other device capable of outputting visible and/or audible information, such as to a user of humidifier device 102.

Control circuitry 110 of humidifier device 102 may be operably coupled to atomizer 112, humidity sensor 114, and user interface device 116, and may be configured to control the operations of humidifier device 102. For example, control circuitry 110 may be configured to control the amount of moisture that atomizer 112 outputs into duct 108. Examples of control circuitry 110 of humidifier may include any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor in control circuitry 110 may be integrated circuitry, i.e., integrated processing circuitry, and that the integrated processing circuitry may be realized as fixed hardware processing circuitry, programmable processing circuitry and/or a combination of both fixed and programmable processing circuitry.

Control circuitry 110 may be configured to receive from humidity sensor 114 an indication of the humidity levels sensed by humidity sensor 114. For example, humidity sensor 114 and control circuitry 110 may be operably coupled via busses or other communications channels and humidity sensor 114 may send signals or other indications of the humidity levels that humidity sensor 114 senses to control circuitry.

In some examples, control circuitry 110 may periodically (e.g., every second, every five seconds, and the like) or continuously receive an indication of the current humidity level from humidity sensor 114, such as in the form of absolute humidity, relative humidity, specific humidity, and the like. In other examples where humidity sensor 114 is configured to send an indication when the humidity level reaches and/or exceeds a specified threshold, control circuitry 110 may be configured to receive from humidity sensor 114 an indication that the humidity level has reached and/or exceeded the specified threshold each time humidity sensor 114 determines that the humidity level has reached and/or exceeded the specified threshold.

Control circuitry 110 may be configured to determine, based at least in part on the humidity levels sensed by humidity sensor 114, whether opening 122 of atomizer enclosure 120 is open (i.e., whether access door 124 is open). Because atomizer 112 inside of atomizer enclosure 120 may be configured to output moisture regardless of whether opening 122 of atomizer enclosure 120 is open or closed, at least a portion of the moisture that atomizer 112 outputs may end up flowing through opening 122 to the outside of atomizer enclosure 120 when opening 122 of atomizer enclosure 120 is open. Thus, the moisture flowing through opening 122 to the outside of atomizer enclosure 120 may cause the humidity levels outside of atomizer enclosure 120 to increase, and control circuitry 110 may be able to determine that atomizer enclosure 120 is open based at least in part on determining whether the humidity levels sensed by humidity level is indicative of opening 122 of atomizer enclosure 120 being open and thereby allowing moisture to flow out of opening 122.

In some examples, control circuitry 110 may determine whether the humidity levels sensed by humidity sensor 114 are indicative of opening 122 of atomizer enclosure 120 being open. For example, control circuitry 110 may determine whether the level of humidity reaches or exceeds than a specified threshold of humidity. If control circuitry 110 determines that the level of humidity reaches or exceeds the specified threshold, control circuitry 110 may determine that the humidity levels sensed by humidity sensor 114 are indicative of opening 122 of atomizer enclosure 120 being open. Opening 122 may be deemed to be open if access door 124 is open, and access door 124 may be determined to be open if it is not completely closed against atomizer enclosure 120. As described above, access door 124 may be open if it is not latched against atomizer enclosure 120, such as via a latching mechanism.

The threshold may be specified in terms of absolute humidity, relative humidity, specific humidity, and the like. In particular, the threshold may correspond to moisture being introduced, such as via opening 122, outside of atomizer enclosure 120. In some examples, when the threshold is specified in terms of relative humidity, the threshold may be 80%, 90%, 99%, 100%, and the like.

In some examples, the threshold may also specify a length of time (e.g., in seconds) in which the level of humidity sensed by humidity sensor 114 reaches or exceeds the threshold. This may differentiate between the opening 122 of atomizer enclosure 120 being open for a short amount of time in order to service atomizer 112 and then closed afterwards versus access door 124 being left open after servicing atomizer 112. Thus, control circuitry 110 may determine that the humidity levels sensed by humidity sensor 114 are indicative of opening 122 of atomizer enclosure 120 being open if control circuitry 110 determines that the level of humidity reaches or exceeds the specified threshold for at least the specified length of time, where the specified length of time may be thirty seconds, one minute, and the like. In contrast, if control circuitry 110 determines that the level of humidity reaches or exceeds the specified threshold but for a shorter amount of time than the specified length of time before dropping below the threshold, control circuitry 110 may determine that the humidity levels sensed by humidity sensor 114 are not indicative of that opening 122 of atomizer enclosure 120 being open despite the level of humidity reaching or exceeding the specified threshold.

In another example, to determine whether the humidity levels sensed by humidity sensor 114 are indicative of opening 122 of atomizer enclosure 120 being open, control circuitry 110 may determine whether the rate of increase in the level of humidity sensed by humidity sensor 114 meets or exceeds a specified threshold. If control circuitry 110 determines that the rate of increase in the level of humidity reaches or exceeds the specified threshold, control circuitry 110 may determine that the humidity levels sensed by humidity sensor 114 are indicative of opening 122 of atomizer enclosure 120 being open.

The threshold may be specified in terms of a percentage increase in absolute humidity, relative humidity, specific humidity, and the like over a specified time period (e.g., 30 seconds, 90 seconds, etc.) associated with the threshold because a rapid increase in humidity levels may indicate that moisture is being introduced through opening 122 to the outside of atomizer enclosure 120. If control circuitry 110 determines that the rate of increase in the level of humidity reaches or exceeds the specified threshold over no more than the specified time period, control circuitry 110 may determine that the humidity levels sensed by humidity sensor 114 are indicative of opening 122 of atomizer enclosure 120 being open. In some examples, the threshold may be a 30%, 40%, 50% and the like increase in absolute humidity, relative humidity, or specific humidity over a specified time period such as 5 seconds, 10 seconds, 30 seconds, and the like.

In some examples, control circuitry 110 may be configured to combine the threshold level of humidity with the threshold rate of increase in the level of humidity to determine whether the humidity levels sensed by humidity sensor 114 indicate that opening 122 of atomizer enclosure 120 is open. For example, if control circuitry 110 determines that the rate of increase in humidity levels sensed by humidity sensor 114 reaches or exceeds the specified threshold rate of increase within the specified time period associated with the threshold rate of increase, and if the level of humidity sensed by humidity sensor 114 reaches or exceeds the specified threshold level of humidity for at least the specified length of time associated with the threshold humidity level, control circuitry 110 may determine that the levels of humidity sensed by humidity sensor 114 are indicative of opening 122 of atomizer enclosure 120 being open.

Control circuitry 110 may be configured to, in response to determining that the humidity levels sensed by humidity sensor 114 are indicative of opening 122 of atomizer enclosure 120 being open, cause user interface device 116 to output an alert indicative of opening 122 of atomizer enclosure 120 being open. For example, control circuitry 110 may send an indication that the humidity levels sensed by humidity sensor 114 are indicative of opening 122 of atomizer enclosure 120 being open to user interface device 116, such as via a bus or another suitable communication channel.

User interface device 116 may be configured to, in response to control circuitry 110 determining that the humidity levels sensed by humidity sensor 114 are indicative of opening 122 of atomizer enclosure 120 being open, output an alert indicative of opening 122 of atomizer enclosure 120 being open. In particular, user interface device 116 may be configured to receive from control circuitry 110 an indication that the humidity levels sensed by humidity sensor 114 are indicative of opening 122 of atomizer enclosure 120 being open and, in response, act as an output device to output the alert.

In some examples, user interface device 116 may include a display and the display may be configured to, in response to user interface device 116 receiving from control circuitry 110 an indication that the humidity levels sensed by humidity sensor 114 are indicative of opening 122 of atomizer enclosure 120 being open, display information indicative of opening 122 of atomizer enclosure 120 being open. The information displayed by user interface device 116 may be a textual message, a graphical image, a video, an animation, or any other suitable visual representation that is indicative of opening 122 of atomizer enclosure 120 being open.

In some examples, user interface device 116 may include an audio output device such as a speaker, and the audio output device may be configured to, in response to user interface device 116 receiving from control circuitry 110 an indication that the humidity levels sensed by humidity sensor 114 are indicative of opening 122 of atomizer enclosure 120 being open, output audio indicative of opening 122 of atomizer enclosure 120 being open. The audio may be a spoken message, a siren, a chime, or any other suitable audio indicative of opening 122 of atomizer enclosure 120 being open.

In some examples, user interface device 116 may include multiple output devices that may each be configured to output an indication that the humidity levels sensed by humidity sensor 114 are indicative of opening 122 of atomizer enclosure 120 being open. For example, user interface device 116 may include multiple displays, multiple audio output devices, or both a display and an audio output device that may each be configured to output an indication that the humidity levels sensed by humidity sensor 114 are indicative of opening 122 of atomizer enclosure 120 being open.

In some examples, control circuitry 110 may be configured to shut down humidifier device 102 in response to determining that opening 122 of atomizer enclosure remains open. For example, if control circuitry 110 determines that the humidity levels sensed by humidity sensor 114 are indicative of opening 122 of atomizer enclosure 120 being open based at least in part on the level of humidity sensed by humidity sensor 114 reaching or exceeding a previous threshold level of humidity, control circuitry 110 may be configured to shut down humidifier device in response to the level of humidity sensed by humidity sensor 114 reaching or exceeding a second threshold level of humidity that is higher than the previous threshold level of humidity.

In another example, if control circuitry 110 determines that the humidity levels sensed by humidity sensor 114 are indicative of opening 122 of atomizer enclosure 120 being open based at least in part on the level of humidity sensed by humidity sensor 114 reaching or exceeding a threshold level of humidity, control circuitry 110 may be configured to shut down humidifier device in response to the level of humidity sensed by humidity sensor 114 continuing to meet or exceed the threshold level of humidity for a certain amount of time (e.g., one minute, two minutes, etc.). In another example, if control circuitry 110 determines that the humidity levels sensed by humidity sensor 114 are indicative of opening 122 of atomizer enclosure 120 being open based at least in part on a rate of increase in the level of humidity sensed by humidity sensor 114 that meets a threshold rate of increase, control circuitry 110 may be configured to shut down humidifier device in response to the level of humidity sensed by humidity sensor 114 continuing to meet or exceed a specified threshold level of humidity for a certain amount of time (e.g., one minute, two minutes, etc.).

Figure 2:
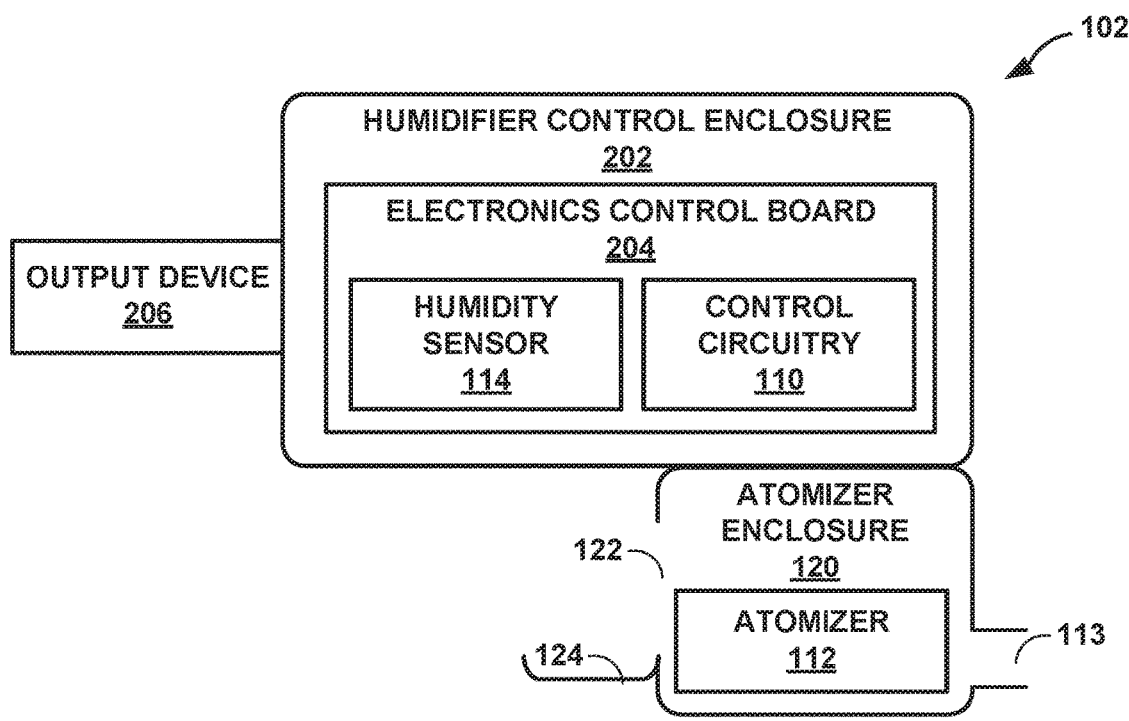
FIG. 2 illustrates the example humidifier device of FIG. 1 in further detail.

FIG. 2 illustrates the example humidifier device 102 of FIG. 1 in further detail. As shown in FIG. 2, humidifier device 102 may include two enclosures: atomizer enclosure 120 and electronics enclosure 202. Atomizer enclosure 120 and electronics enclosure 202 may be separate enclosures in that electronics enclosure 202 does not enclose atomizer enclosure 120 and atomizer enclosure 120 does not enclose electronics enclosure 202. In some examples, a humidifier enclosure (not shown) may enclose both atomizer enclosure 120 and electronics enclosure 202. Electronics enclosure 202 and atomizer enclosure 120 may each be made of any suitable material, such as plastic, steel, and the like. Humidifier device 102 may also include output device 206, which is an example of user interface device 116 shown in FIG. 1, such as a display, a loudspeaker, and a like.

As described with respect to FIG. 1, atomizer enclosure 120 includes atomizer 112 that produces moisture. Atomizer enclosure 120 includes two openings: opening 113 and opening 122. Opening 122 is covered by access door 124 that may open and close to uncover and cover opening 122, respectively.

Electronics enclosure 202 may include control circuitry 110 and humidity sensor 114 that are operably coupled to electronics control board 204. Electronics control board 204 may be a printed circuit board or any other suitable electronics control board. While electronics enclosure 202 may look like a fully sealed box or enclosure, electronics enclosure 202 may not necessarily be an airtight enclosure. As such, when opening 122 of atomizer enclosure 120 is open, at least some of the moisture that flows out of opening 122 of atomizer enclosure 120 may nonetheless flow into electronics enclosure 202 and may reach and potentially damage electronics control board 204 and control circuitry 110.

As such, humidity sensor 114 within electronics enclosure 202 may sense the humidity levels within electronics enclosure 202 and may send indications of the humidity levels sensed by humidity sensor 114 to control circuitry 110. Control circuitry 110 may be configured to determine, based at least in part on the humidity levels within electronics enclosure 202 sensed by humidity sensor 114 whether the humidity levels sensed by humidity sensor 114 are indicative of opening 122 of atomizer enclosure 120 being open, using the techniques described throughout this disclosure. If control circuitry 110 determines that the humidity levels are indicative of opening 122 of atomizer enclosure 120 being open, control circuitry 110 may be configured to send an indication that opening 122 of atomizer enclosure 120 is open to output device 206. Output device 206 may be configured to receive from control circuitry 110 the indication that opening 122 of atomizer enclosure 120 is open and may be configured to, in response, output an alert indicative of opening 122 of atomizer enclosure 120 is open.

Figure 3:
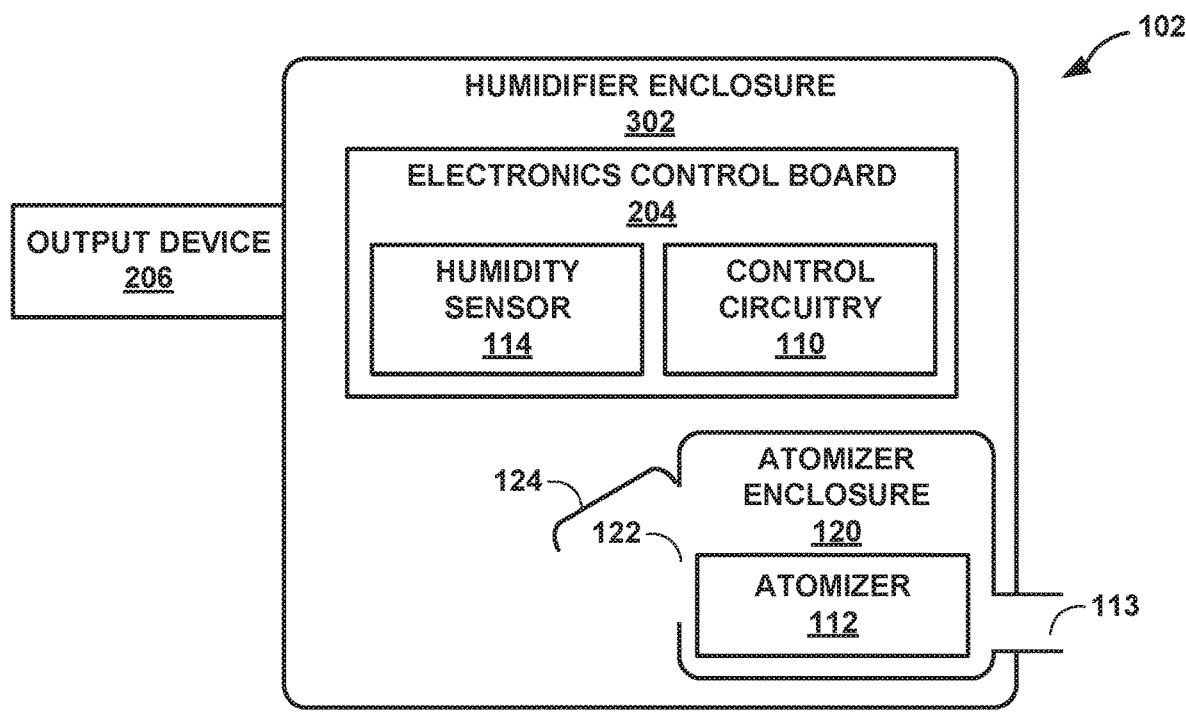
FIG. 3 illustrates the example humidifier device of FIG. 1 in further detail.

FIG. 3 illustrates the example humidifier device 102 of FIG. 1 in further detail. As shown in FIG. 3, humidifier device 102 may include two enclosures: atomizer enclosure 120 and humidifier enclosure 302. Humidifier enclosure 302 may enclose the components of humidifier device 102. In particular, humidifier enclosure 302 may enclose control circuitry 110 and humidity sensor 114 that are operably coupled to electronics control board 204 as well as atomizer enclosure 120. Humidifier enclosure 302 and atomizer enclosure 120 may each be made of any suitable material, such as plastic, steel, and the like.

As described with respect to FIG. 1, atomizer enclosure 120 includes atomizer 112 that produces moisture. Atomizer enclosure 120 includes two openings: opening 113 and opening 122. Opening 122 is covered by access door 124 that may open and close to uncover and cover opening 122, respectively. When opening 122 of atomizer enclosure 120 is open, moisture may flow out of opening 122 of atomizer enclosure 120 may reach and potentially damage electronics control board 204 and control circuitry 110.

As such, humidity sensor 114 may sense the humidity levels within humidifier enclosure 302 and may send indications of the humidity levels sensed by humidity sensor 114 to control circuitry 110. Control circuitry 110 may be configured to determine, based at least in part on the humidity levels within humidifier enclosure 302 sensed by humidity sensor 114 whether the humidity levels are indicative of opening 122 of atomizer enclosure 120 being open, using the techniques described throughout this disclosure. If control circuitry 110 determines that the humidity levels are indicative of opening 122 of atomizer enclosure 120 being open, control circuitry 110 may be configured to send an indication that opening 122 of atomizer enclosure 120 is open to output device 206. Output device 206 may be configured to receive from control circuitry 110 the indication that opening 122 of atomizer enclosure 120 is open and may be configured to, in response, output an alert indicative of opening 122 of atomizer enclosure 120 is open.

Figure 4:
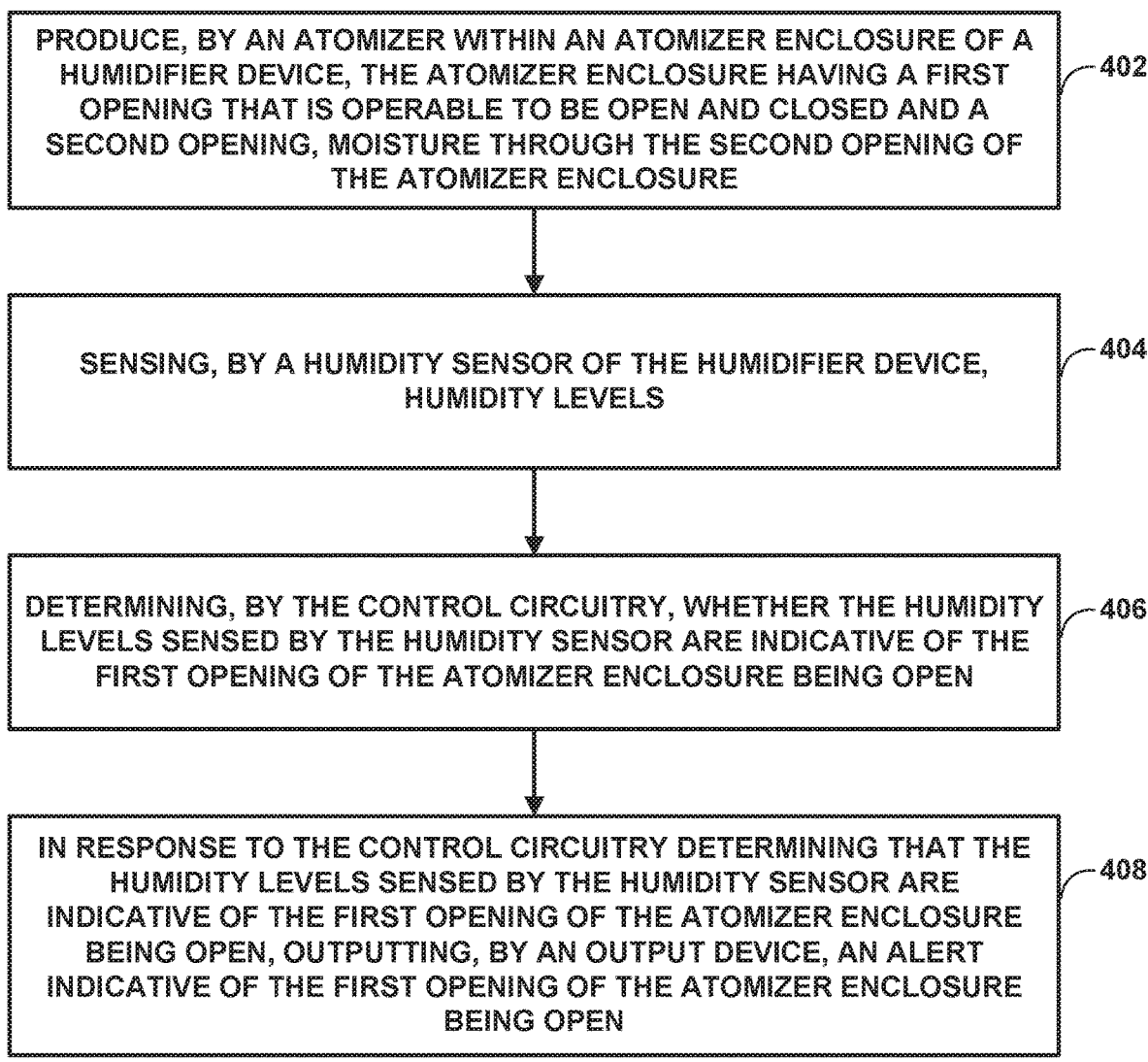
FIG. 4 illustrates an example process for determining whether an access door of an atomizer enclosure in a humidifier device has been left open.

FIG. 4 illustrates an example process for determining whether an access door of an atomizer enclosure in a humidifier device has been left open. Although described with respect to system 100 and humidifier device 102 of FIGS. 1-3, it should be understood that other devices may be configured to perform a method similar to that of FIG. 4.

As shown in FIG. 4, an atomizer 112 within an atomizer enclosure 120 of a humidifier device 102, the atomizer enclosure 120 having a first opening 122 that is operable to be open and closed and a second opening 113, may produce moisture that flows out the second opening 113 of the atomizer enclosure 120 (402). A humidifier sensor 114 of the humidifier device 102 may sense humidity levels (404). The control circuitry 110 may determine whether the humidity levels sensed by the humidity sensor 114 are indicative of the first opening 122 of the atomizer enclosure 120 being open (406). In response to the control circuitry 110 determining that the humidity levels sensed by the humidity sensor 114 are indicative of the first opening 122 of the atomizer enclosure 120 being open, an output device 206 may output an alert indicative of the first opening 122 of the atomizer enclosure 120 being open (408).

In some examples, the humidifier device 102 further comprises an electronics enclosure 202 that encloses the control circuitry 110 and the humidity sensor 114, and the humidity levels sensed by the humidity sensor 114 comprises the humidity levels within the electronics enclosure 202. In some examples, the control circuitry 110 and the humidity sensor 114 are disposed on an electronic control board 204 within the electronics enclosure 202.

In some examples, to determine whether the humidity levels sensed by the humidity sensor 114 are indicative of the first opening 122 of the atomizer enclosure 120 being open, control circuitry 110 may determine whether the humidity levels sensed by the humidity sensor 114 are indicative of an access door 124 for the first opening 122 of the atomizer enclosure 120 being open. In response to the control circuitry 110 determining that the humidity levels sensed by the humidity sensor 114 are indicative of the access door 124 for the first opening 122 of the atomizer enclosure 120 being open, the output device 206 may output the alert indicative of the access door 124 of the atomizer enclosure 120 being open.

In some examples, to determine whether the humidity levels sensed by the humidity sensor 114 are indicative of the first opening 122 of the atomizer enclosure 120 being open, control circuitry 110 may determine whether the humidity levels sensed by the humidity sensor 114 are indicative of a removable cover for the first opening 122 of the atomizer enclosure 120 being removed from the first opening 122 of the atomizer enclosure 120. In response to the control circuitry 110 determining that the humidity levels sensed by the humidity sensor 114 are indicative of the atomizer enclosure 120 being removed from the first opening 122 of the atomizer enclosure 120, the output device 206 may output the alert indicative of the atomizer enclosure 120 being removed from the first opening 122 of the atomizer enclosure 120.

In some examples, to determine whether the humidity levels sensed by the humidity sensor 114 are indicative of the first opening 122 of the atomizer enclosure 120 being open, control circuitry 110 may determine whether a humidity level sensed by the humidity sensor 114 exceeds a threshold. Control circuitry 110 may, in response to determining that the humidity level sensed by the humidity sensor 114 exceeds the threshold, determine that the humidity level sensed by the humidity sensor 114 is indicative of the opening 122 on the atomizer enclosure 120 of the humidifier device 102 being open.

In some examples, to determine whether the humidity levels sensed by the humidity sensor 114 are indicative of the first opening 122 of the atomizer enclosure 120 being open, control circuitry 110 may determine whether a rate of increase in the humidity levels sensed by the humidity sensor 114 exceeds a threshold. Control circuitry 11—may, in response to determining that the rate of increase in the humidity levels sensed by the humidity sensor 114 exceeds the threshold, determine that the humidity levels sensed by the humidity sensor 114 are indicative of the opening 122 on the atomizer enclosure 120 of the humidifier device 102 being open.

In some examples, control circuitry 110 may determine whether the first opening 122 of the atomizer enclosure 120 is open based at least in part on the humidity levels sensed by the humidity sensor 114 by determining whether a humidity level sensed by the humidity sensor 114 exceeds a threshold. In response to determining that the humidity level sensed by the humidity sensor 114 exceeds the threshold, control circuitry 110 may shut down the humidifier device 102.

In some examples, the output device 206 comprises a display, and the display may output the alert indicative of the first opening 122 of the atomizer enclosure 120 being open by displaying information indicative of the first opening 122 of the atomizer enclosure 120 being open.

In some examples, the output device 206 comprises a speaker, and the speaker may output the alert indicative of the first opening 122 of the atomizer enclosure 120 being open by outputting audio indicative of the first opening 122 of the atomizer enclosure 120 being open.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, magnetic disk storage, or other magnetic storage devices, flash memory, or any other medium that can be used to store desired program code in the form of instructions or data structures and that can be accessed by processing circuitry. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for performing the techniques described herein for determining whether the access door of the atomizer enclosure is open or closed. Also, the techniques could be fully implemented in one or more circuits or logic elements.

The techniques of this disclosure may be implemented in a wide variety of devices or apparatuses. Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. These and other examples are within the scope of the following claims.

The invention claimed is:

1. A humidifier device comprising:
an atomizer enclosure having a first opening that is operable to be open and closed and a second opening;
an atomizer within the atomizer enclosure configured to produce moisture and to output the moisture through the second opening of the atomizer enclosure;
a humidity sensor configured to sense humidity levels; and
control circuitry configured to:
control the atomizer; and
determine whether the humidity levels sensed by the humidity sensor are indicative of the first opening of the atomizer enclosure being open; and
an output device configured to, in response to determining that the humidity levels sensed by the humidity sensor are indicative of the first opening of the atomizer enclosure being open, output an alert indicative of the first opening of the atomizer enclosure being open.

2. The humidifier device of claim 1, wherein:
the humidifier further comprises an electronics enclosure that encloses the control circuitry and the humidity sensor,
wherein the humidity sensor is configured to sense the humidity levels within the electronics enclosure.

3. The humidifier device of claim 2, further comprising:
an electronic control board within the electronics enclosure, wherein the control circuitry and the humidity sensor are disposed on the electronic control board.

4. The humidifier device of claim 1, further comprising:
an access door configured to cover the first opening of the atomizer enclosure,
wherein to determine whether the humidity levels sensed by the humidity sensor are indicative of the first opening of the atomizer enclosure being open, the control circuitry is further configured to determine whether the humidity levels sensed by the humidity sensor are indicative of the access door of the first opening of the atomizer enclosure being open, and
wherein to output the alert indicative of the first opening of the atomizer enclosure being open, the output device is further configured to, in response to determining that the humidity levels sensed by the humidity sensor are indicative of the access door for the first opening of the atomizer enclosure being open, output the alert indicative of the access door being open.

5. The humidifier device of claim 1, further comprising:
a removable cover configured to cover the first opening of the atomizer enclosure,
wherein to determine whether the humidity levels sensed by the humidity sensor are indicative of the first opening of the atomizer enclosure being open, the control circuitry is further configured to determine whether the humidity levels sensed by the humidity sensor are indicative of the removable cover for the first opening of the atomizer enclosure being removed from the first opening of the atomizer enclosure, and
wherein to output the alert indicative of the first opening of the atomizer enclosure being open, the output device is further configured to, in response to determining that the humidity levels sensed by the humidity sensor are indicative of the removable cover being removed from the first opening of the atomizer enclosure, output the alert indicative of the removable cover being removed from the first opening of the atomizer enclosure.

6. The humidifier device of claim 1, wherein to determine whether the humidity levels sensed by the humidity sensor are indicative of the first opening of the atomizer enclosure being open, the control circuitry is further configured to:
determine whether a humidity level sensed by the humidity sensor exceeds a threshold; and
in response to determining that the humidity level sensed by the humidity sensor exceeds the threshold, determine that the humidity level sensed by the humidity sensor is indicative of the first opening of the atomizer enclosure of the humidifier device being open.

7. The humidifier device of claim 1, wherein to determine whether the humidity levels sensed by the humidity sensor are indicative of the first opening of the atomizer enclosure of the humidifier device being open, the control circuitry is further configured to:
determine whether a rate of increase in the humidity levels sensed by the humidity sensor exceeds a threshold; and
in response to determining that the rate of increase in the humidity levels sensed by the humidity sensor exceeds the threshold, determine that the humidity levels sensed by the humidity sensor are indicative of the first opening of the atomizer enclosure of the humidifier device being open.

8. The humidifier device of claim 1, wherein the control circuitry is further configured to:
determine whether a humidity level sensed by the humidity sensor exceeds a threshold; and
in response to determining that the humidity level sensed by the humidity sensor exceeds the threshold, shut down the humidifier device.

9. The humidifier device of claim 1, wherein:
the output device comprises a display; and
to output the alert indicative of the first opening of the atomizer enclosure being open, the display is configured to display information indicative of the first opening of the atomizer enclosure of the humidifier device being open.

10. The humidifier device of claim 1, wherein:
the output device comprises a speaker; and
to output the alert indicative of the first opening of the atomizer enclosure of the humidifier device being open, the speaker is configured to output audio indicative of the first opening of the atomizer enclosure of the humidifier device being open.

11. A method comprising:
producing, by an atomizer within an atomizer enclosure of a humidifier device, the atomizer enclosure having a first opening that is operable to be open and closed and a second opening, moisture that flow out of the second opening of the atomizer enclosure;
sensing, by a humidity sensor of the humidifier device, humidity levels:
determining, by control circuitry of the humidifier device, whether the humidity levels sensed by the humidity sensor are indicative of the first opening of the atomizer enclosure being open; and
in response to the control circuitry determining that the humidity levels sensed by the humidity sensor are indicative of the first opening of the atomizer enclosure being open, outputting, by an output device of the humidifier device, an alert indicative of the first opening of the atomizer enclosure being open.

12. The method of claim 11, wherein:
the humidifier device further comprises an electronics enclosure that encloses the control circuitry and the humidity sensor; and
the humidity levels sensed by the humidity sensor comprises the humidity levels within the electronics enclosure.

13. The method of claim 12, wherein:
the control circuitry and the humidity sensor are disposed on an electronic control board within the electronics enclosure.

14. The method of claim 11, wherein:
determining, by the control circuitry, whether the humidity levels sensed by the humidity sensor are indicative the first opening of the atomizer enclosure being open comprises determining, by the control circuitry, whether the humidity levels sensed by the humidity sensor are indicative of an access door for the first opening of the atomizer enclosure being open; and
in response to the control circuitry determining that the humidity levels sensed by the humidity sensor are indicative of the first opening of the atomizer enclosure being open, outputting, by the output device, the alert indicative of the first opening of the atomizer enclosure being open comprises in response to the control circuitry determining that the humidity levels sensed by the humidity sensor are indicative of the access door for the first opening of the atomizer enclosure being open, outputting, by the output device, the alert indicative of the access door of the atomizer enclosure being open.

15. The method of claim 11, wherein:
determining, by the control circuitry, whether the humidity levels sensed by the humidity sensor are indicative of the first opening of the atomizer enclosure being open comprises determining, by the control circuitry, whether the humidity levels sensed by the humidity sensor are indicative of a removable cover for the first opening of the atomizer enclosure being removed from the first opening of the atomizer enclosure; and
in response to the control circuitry determining that the humidity levels sensed by the humidity sensor are indicative of the first opening of the atomizer enclosure being open, outputting, by the output device, the alert indicative of the first opening of the atomizer enclosure being open comprises in response to the control circuitry determining that the humidity levels sensed by the humidity sensor are indicative of the removable cover being removed from the first opening of the atomizer enclosure, outputting, by the output device, the alert indicative of the removable cover being removed from the first opening of the atomizer enclosure.

16. The method of claim 11, wherein determining, by the control circuitry, whether the humidity levels sensed by the humidity sensor are indicative of the first opening of the atomizer enclosure being open comprises:
determining, by the control circuitry, whether a humidity level sensed by the humidity sensor exceeds a threshold; and
in response to determining that the humidity level sensed by the humidity sensor exceeds the threshold, determining, by the control circuitry, that the humidity level sensed by the humidity sensor is indicative of the first opening of the atomizer enclosure of the humidifier device being open.

17. The method of claim 11, wherein determining, by the control circuitry, whether the humidity levels sensed by the humidity sensor are indicative of the first opening of the atomizer enclosure being open comprises:
determining, by the control circuitry, whether a rate of increase in the humidity levels sensed by the humidity sensor exceeds a threshold; and
in response to determining that the rate of increase in the humidity levels sensed by the humidity sensor exceeds the threshold, determining, by the control circuitry, that the humidity levels sensed by the humidity sensor are indicative of the first opening of the atomizer enclosure of the humidifier device being open.

18. The method of claim 11, further comprising:
determining, by the control circuitry, whether a humidity level sensed by the humidity sensor exceeds a threshold; and
in response to determining that the humidity level sensed by the humidity sensor exceeds the threshold, shutting down, by the control circuitry, the humidifier device.

19. The method of claim 11, wherein:
the output device comprises a display; and
outputting, by the output device, the alert indicative of the first opening of the atomizer enclosure being open comprises displaying, by the display, information indicative of the first opening of the atomizer enclosure being open.

20. The method of claim 11, wherein:
the output device comprises a speaker; and
outputting, by the output device, the alert indicative of the first opening of the atomizer enclosure being open comprises outputting, by the speaker, audio indicative of the first opening of the atomizer enclosure of the humidifier device being open.

* * * * *